US008554451B2

(12) United States Patent
Tsuji et al.

(10) Patent No.: US 8,554,451 B2
(45) Date of Patent: Oct. 8, 2013

(54) STOP CONTROL SYSTEM FOR INTERNAL COMBUSTION ENGINE

(75) Inventors: Kanta Tsuji, Wako (JP); Atsushi Mitsui, Wako (JP); Fumio Hara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 13/125,827

(22) PCT Filed: Oct. 29, 2009

(86) PCT No.: PCT/JP2009/068625
§ 371 (c)(1),
(2), (4) Date: Apr. 25, 2011

(87) PCT Pub. No.: WO2010/055782
PCT Pub. Date: May 20, 2010

(65) Prior Publication Data
US 2011/0208411 A1    Aug. 25, 2011

(30) Foreign Application Priority Data

Nov. 13, 2008 (JP) ................................. 2008-290455

(51) Int. Cl.
*F02N 11/08* (2006.01)
*F02N 11/10* (2006.01)

(52) U.S. Cl.
USPC .......................... 701/112; 123/399; 123/179.4

(58) Field of Classification Search
USPC .......... 701/112, 113, 114; 123/399, 403, 325, 123/332, 179.4, 198 DB, 198 C
See application file for complete search history.

(56) References Cited

U.S. PATENT DOCUMENTS

| 7,079,941 B2* | 7/2006 | Tetsuno et al. ................ 701/112 |
| 2004/0153235 A1* | 8/2004 | Kataoka et al. ............... 701/112 |
| 2004/0255904 A1* | 12/2004 | Izawa et al. ................... 123/352 |

(Continued)

FOREIGN PATENT DOCUMENTS

| CN | 1946923 A | 4/2007 |
| DE | 199 49 931 A1 | 4/2001 |

(Continued)

OTHER PUBLICATIONS

European Search Report application No. EP 09 82 6032 dated Mar. 14, 2012.

(Continued)

*Primary Examiner* — Mahmoud Gimie
(74) *Attorney, Agent, or Firm* — Squire Sanders (US) LLP

(57) ABSTRACT

A stop control system for an internal combustion engine, which controls a stop position of a piston of the engine, is provided. An valve opening amount of an intake air flow rate control valve is determined based on the detected engine rotational speed and the detected crank angle after the ignition switch is turned off, and the intake air flow rate control valve is controlled so that the valve opening amount of the intake air flow rate control valve coincides with the determined valve opening amount. For example, the valve opening amount of the intake air flow rate control valve is determined according to the crank angle at the time the engine rotational speed decreases to reach a predetermined range, and the intake air flow rate control valve is controlled to be opened. With this control, the intake air amount of the engine is increased so that the stop position of the piston coincides with the desired position.

14 Claims, 13 Drawing Sheets

(56) References Cited

U.S. PATENT DOCUMENTS

| | | | |
|---|---|---|---|
| 2005/0045148 A1* | 3/2005 | Katsuragawa et al. | 123/396 |
| 2006/0065223 A1 | 3/2006 | Freisinger | |
| 2006/0129305 A1* | 6/2006 | Nishikawa et al. | 701/112 |
| 2009/0248282 A1* | 10/2009 | Adachi | 701/112 |
| 2010/0012086 A1* | 1/2010 | Demura | 123/399 |
| 2011/0288753 A1* | 11/2011 | Mitsui et al. | 701/112 |

FOREIGN PATENT DOCUMENTS

| | | | |
|---|---|---|---|
| DE | 102 10 246 A1 | 9/2002 | |
| EP | 1 676 999 A2 | 7/2006 | |
| JP | 2004-232539 | 8/2004 | |
| JP | 2005320909 A * | 11/2005 | F02D 11/10 |
| JP | 2006-242082 | 9/2006 | |
| JP | 2007-503549 | 2/2007 | |
| JP | 2007-327364 | 12/2007 | |
| JP | 2007315316 A * | 12/2007 | |

OTHER PUBLICATIONS

Chinese Office Action application No. 200980144945.8 dated Mar. 5, 2013.

* cited by examiner

FIG. 10
(a)
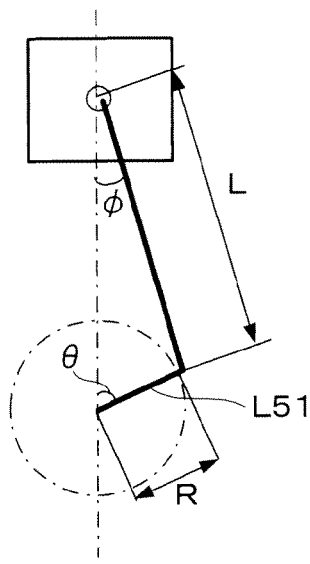
(b)
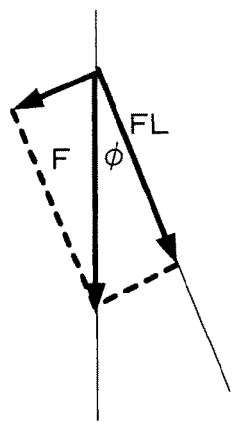
(c)
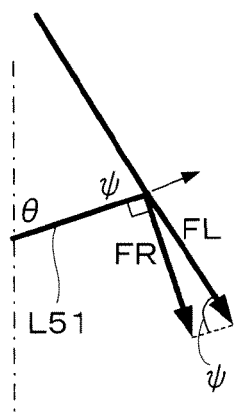

FIG. 16

| NE [rpm]<br>CA [deg] | 455 | 465 | 485 | 495 | 505 |
|---|---|---|---|---|---|
| 90 | THS1 | THS1 | THS2 | THS2 | THS2 |
| 60 | THS1 | THS1 | THS1 | THS2 | THS2 |
| 30 | THS1 | THS1 | THS1 | THS1 | THS2 |
| CA0 | THS1 | THS1 | THS1 | THS1 | THS2 |

STOP CONTROL SYSTEM FOR INTERNAL COMBUSTION ENGINE

TECHNICAL FIELD

The present invention relates to a stop control system for controlling a stop position of a piston of an internal combustion engine at the time when the engine stops.

BACKGROUND ART

The patent document 1 (shown below) discloses a stop control system which performs a control for increasing the intake air amount immediately before the engine stoppage to increase a negative rotational torque generated by the cylinder in the compression stroke. According to this control system, the crank angular range in which the engine stops can be controlled in the narrower range compared with the conventional control method.

PRIOR ART DOCUMENT

Patent Document

Patent Document 1: Japanese Patent Laid-open No. 2004-232539

SUMMARY OF THE INVENTION

Problems to be Solved by the Invention

If there exists a cylinder which is in the state where both of the intake valve and the exhaust valve are opened when the engine stops (the state will be hereinafter referred to as "overlapped state"), the exhaust gas may flow back to the intake pipe upon the next engine start, which makes it difficult to smoothly start the engine. Therefore, it is necessary to perform the stop control so that the engine does not stop in the overlapped state.

Although the method disclosed in the patent document 1 enables to narrow the crank angular range at the engine stoppage, it is not possible to surely avoid the engine stoppage in the overlapped state.

The present invention was made contemplating the above-described point, and an objective of the invention is to provide a stop control system for an internal combustion engine, which enables to surely avoid the engine stoppage in the overlapped state where both of the intake value and the exhaust valve of one cylinder are opened.

Means for Solving the Problems

To attain the above-described objective, the present invention provides a stop control system for an internal combustion engine having stop means for stopping at least one of an ignition and a fuel injection of the engine based on a stop command of the internal combustion engine, an intake air flow rate control valve (3) for controlling an intake air flow rate of the engine, stop position control means for controlling a stop position of a piston of the engine by actuating the intake air flow rate control valve (3), rotational angle detecting means (8) for detecting a rotational angle (CA) of a crankshaft of the engine, and rotational speed detecting means (8) for detecting a rotational speed (NE) of the engine. The stop control system is characterized in that the stop position control means determines a valve opening amount (THCMD) of the intake air flow rate control valve (3) after the operation of the stop means using the engine rotational speed (NE) detected by the rotational speed detecting means and the rotational angle (CA) detected by the rotational angle detecting means, and actuates the intake air flow rate control valve (3) so that the valve opening amount of the intake air flow rate control valve coincides with the determined valve opening amount (THCMD), thereby increasing the intake air flow rate.

With this configuration, the valve opening amount of the intake air flow rate control valve is determined using the detected engine rotational speed and the detected rotational angle, the intake air flow rate control valve is actuated so that the actual valve opening amount coincides with the determined valve opening amount, thereby increasing the intake air flow rate. Therefore, the valve opening amount of the intake air flow rate control valve is more appropriately set, which makes it possible to surely avoid the engine stoppage in the overlapped state.

Specifically, it is preferable to determine the valve opening amount (THCMD) of the intake air flow rate control valve (3) based on the rotational angle (CA) detected by the rotational angle detecting means when the detected engine rotational speed (NE) becomes equal to or less than a predetermined rotational speed (NES2).

With this configuration, the valve opening amount of the intake air flow rate control valve is determined based on the detected rotational angle when the detected engine rotational speed becomes equal to or less than the predetermined rotational speed. Therefore, the valve opening amount of the intake air flow rate control valve is more appropriately set, thereby surely avoiding the engine stoppage in the overlapped state.

Alternatively, the stop position control means may determine the valve opening amount (THCMD) of the intake air flow rate control valve based on the engine rotational speed (NE) detected by the rotational speed detecting means when the rotational angle (CA) detected by the rotational angle detecting means reaches a predetermined rotational angle (CA0).

With this configuration, the valve opening amount of the intake air flow rate control valve is determined based on the detected engine rotational speed when the detected rotational angle reaches the predetermined rotational angle. Therefore, the valve opening amount of the intake air flow rate control valve is more appropriately set, thereby surely avoiding the engine stoppage in the overlapped state. Further, determining the valve opening amount based on the engine rotational speed makes it possible to accurately perform the stop position control even if the friction in the engine changes due to aging, which shifts the engine rotational speed range where the engine stoppage in the overlapped state is avoidable.

Further, the stop position control means may retrieve a map on which the valve opening amount (THCMD) of the intake air flow rate control valve is set according to the engine rotational speed (NE) and the rotational angle (CA), to determine the valve opening amount (THCMD) when the detected engine rotational speed (NE) is within a predetermined range (NES22~NES21).

With this configuration, the valve opening amount of the intake air flow rate control valve is determined by retrieving the map on which the valve opening amount is set according to the engine rotational speed and the rotational angle, when the detected engine rotational speed is within the predetermined range. Therefore, by appropriately setting the map, the engine stoppage in the overlapped state is surely avoided. Further, the range of the engine rotational speed in which the engine stoppage in the overlapped state is avoidable can be extended. Accordingly, the stop position control can accurately be performed even if the friction in the engine changes due to aging to shift the engine rotational speed range in which the engine stoppage in the overlapped state is avoidable.

Further, it is preferable to maintain the valve opening amount (THCMD) of the intake air flow rate control valve (3) at the determined valve opening amount until the engine rotational speed (NE) reaches "0".

With this configuration, the valve opening amount of the intake air flow rate control valve is maintained at the determined valve opening amount until the engine rotational speed reaches "0", which makes it possible to more surely avoid the engine stoppage in the overlapped state.

Preferably, the intake air flow rate control valve (3) is opened before the start timing (CAIS2) of the last intake stroke of a specific cylinder before the engine stoppage. The specific cylinder is a cylinder which is estimated to be in the compression stroke at the time of the engine stoppage.

With this configuration, the engine stoppage in the overlapped state can be avoided by increasing the amount of air supplied to the cylinder which is in the compression stroke at the engine stoppage. In addition, the amount of air supplied to the cylinder which is in the expansion stroke at the engine stoppage, is increased, which increases the power for suppressing the reverse engine rotation to prevent the engine from rotating in the reverse direction to the overlapped state.

Alternatively, the intake air flow rate control valve may be opened before the start timing (CAIS1) of the last intake stroke of a specific cylinder before the engine stoppage. The specific cylinder is a cylinder which is estimated to be in the expansion stroke at the engine stoppage.

With this configuration, the amount of air supplied to the cylinder which is estimated to be in the expansion stroke at the engine stoppage further increases, thereby more increasing the force for suppressing the reverse engine rotation, which makes it possible to more surely prevent the reverse rotation to the overlapped state.

BRIEF DESCRIPTION OF THE DRAWINGS

FIG. 10 shows diagrams for illustrating a calculation method of the cylinder pressure work (ECYL).

FIG. 16 is a diagram showing a map referred to in the process of FIG. 15.

MODE FOR CARRYING OUT THE INVENTION

Preferred embodiments of the present invention will now be described with reference to the drawings.

First Embodiment

Figure 1:
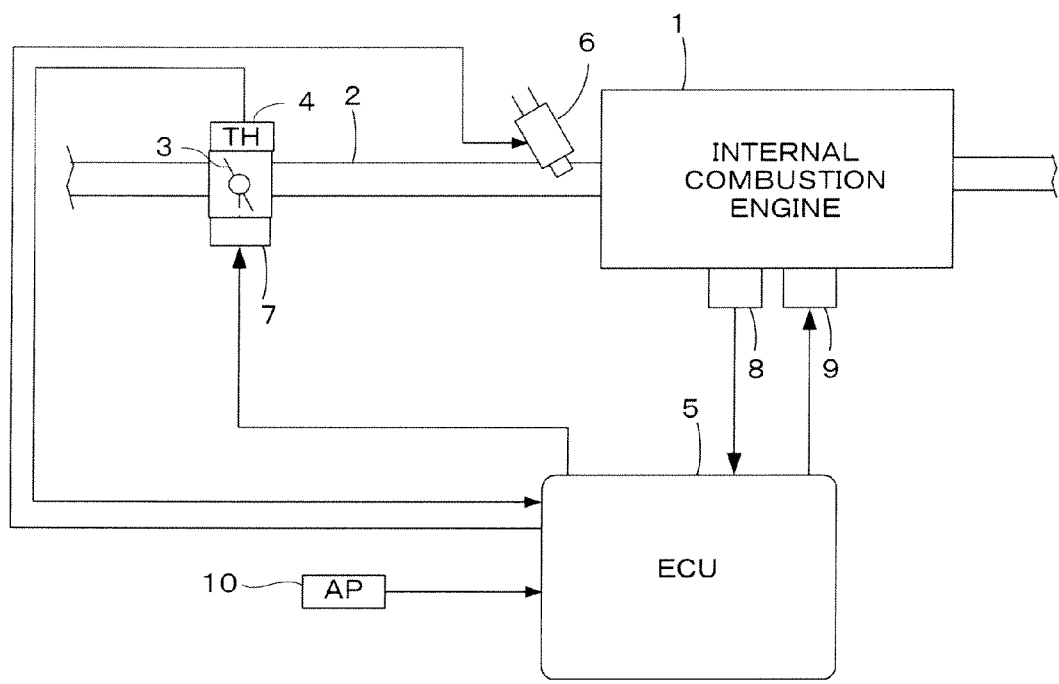
FIG. 1 is a schematic diagram showing a configuration of an internal combustion engine and a control system therefor according to one embodiment of the present invention.

FIG. 1 is a schematic diagram showing a configuration of an internal combustion engine and a control system therefor according one embodiment of the present invention. The internal combustion engine 1 (hereinafter referred to as "engine") is a 6-cylinder engine and has an intake pipe 2 provided with a throttle valve 3. The throttle valve 3 is provided with a throttle valve opening sensor 4 for detecting an opening TH of the throttle valve 3, and a detection signal of the throttle valve sensor 4 is supplied to an electronic control unit 5 (hereinafter referred to as "ECU"). An actuator 7 for actuating the throttle valve 3 is connected to the throttle valve 3, and the operation of the actuator 7 is controlled by the ECU 5.

A fuel injection valve 6 is provided for each cylinder at a position slightly upstream of an intake valve (not shown) in the intake pipe 2. Each injection valve is connected to a fuel pump (not shown) and electrically connected to the ECU 5. A valve opening period of each fuel injection valve 6 is controlled by a signal from the ECU 5. Each cylinder of the engine 1 is provided with a spark plug 9 which is connected to the ECU 5. The ECU 5 supplies an ignition signal to each spark plug 9.

A crank angle position sensor 8 for detecting a rotational angle of a crankshaft (not shown) of the engine 1 is connected to the ECU 5, and a signal corresponding to a detected rotational angle of the crankshaft is supplied to the ECU 5. The crank angle position sensor 8 includes a cylinder discrimination sensor which outputs a pulse (hereinafter deferred to as "CYL pulse") at a predetermined crank angle position for the specific cylinder of the engine 1. The crank angle position sensor also includes a top dead center (TDC) sensor which outputs a TDC pulse at a crank angle position of a predetermined crank angle before the TDC at which the intake stroke starts in each cylinder (i.e. at every 120 degree crank angle in the six-cylinder engine), and a crank angle (CRK) sensor for generating one pulse (hereinafter referred to as "CRK pulse") at intervals of a constant crank angle period (e.g., a period of six degrees, which is shorter than the period of generation of the TDC pulse). The CYL pulse, the TDC pulse, and the CRK pulse are supplied to the ECU 5. The CYL, TDC and CRK pulses are used for controlling various timings, such as a fuel injection timing and an ignition timing, and detecting an engine rotational speed NE.

An accelerator sensor 10 for detecting a depression amount AP of the accelerator pedal of the vehicle driven by the engine 1 (the depression amount will be referred to as "accelerator operation amount") is connected to the ECU 5, and the detection signal of the accelerator sensor 10 is supplied to the ECU 5.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the fuel injection valve 6 and the like. The ECU 5 performs a control of the valve opening period of the fuel injection valve 6 and an ignition timing control of the spark plug 9 based on the detection signals of the above-described sensors. The ECU also calculates a target opening THCMD of the throttle valve 3 and performs a drive control of the actuator 7 so that the detected throttle valve opening TH coincides with the target opening THCMD.

Next, an outline of the piston position control upon engine stoppage (the control will be referred to as "stop position control") in this embodiment is described below.

Figure 2:
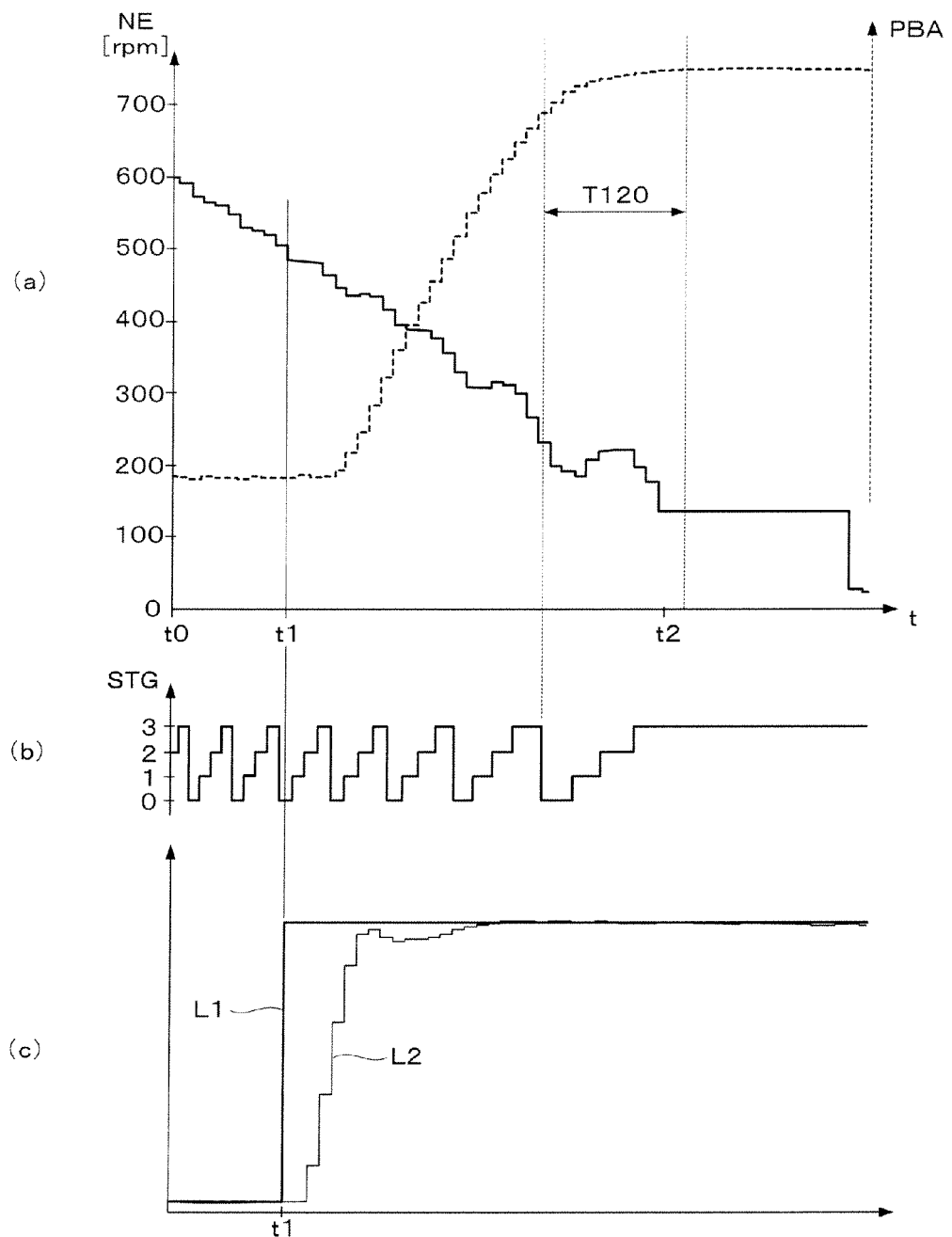
FIG. 2 shows time charts for illustrating an outline of the stop position control of the present invention.

FIG. 2 shows changes in the engine rotational speed NE after the ignition switch is turned off at time t0, an intake pressure PBA (pressure in the intake pipe 2 on the downstream side of the throttle valve 3), a stage number STG indicative of a crank angle position at every 30 degrees of the crankshaft rotational angle, the target opening THCMD and the actual opening TH of the throttle valve. The stage number STG is set as follows by setting the reference angle position CA0 shown in FIG. 4 to "0" degree. That is, the stage number STG is set to "0" when the crank angle CA is equal to or greater than "0" and less than 30 degrees, set to "1" when the crank angle CA is equal to or greater than 30 degrees and less than 60 degrees, set to "2" when the crank angle CA is equal to or greater than 60 degrees and less than 90 degrees, and set to "3" when the crank angle CA is equal to or greater than 90 degrees and less than 120 degrees.

In this embodiment, the target opening THCMD is set according to the crank angle CA at the time (t1) when the engine rotational speed NE enters a predetermined rotational speed range after the ignition switch is turned off, and the throttle valve 3 is opened so that the throttle valve opening TH coincides with the target opening THCMD. In FIG. 2(c), the solid line L1 shows changes in the target opening THCMD and the thin solid line L2 shows changes in the throttle valve opening TH. By opening the throttle valve 3, the intake pressure PBA increases, which accordingly increases a negative torque TRQN (a torque in the direction of stopping the engine rotation) in the cylinder which is in the compression stroke immediately before stoppage, and also generates a positive torque TRQP in the cylinder which is in the expansion stroke.

A total cylinder pressure force FCYL is defined as a sum of the negative force required for intake, compression, and exhaust of gases in each cylinder of the engine and the positive force generated by expansion of gases in each cylinder. Further a "cylinder pressure work ECYL" is defined as a work performed by the total cylinder pressure force FCYL. The inertial energy EINR of the engine at time t0 decreases due to the energy EFRC which is consumed by the cylinder pressure work ECYL and the friction (friction force) FFRC of moving parts in the engine (the energy EFRC will be referred to as "friction work EFRC"). The engine stops when the inertial energy EINR reaches "0", and the absolute value of the total cylinder pressure force FCYL becomes equal to or less than the absolute value of the friction FFRC (time t2). In FIG. 2(a), the engine rotational speed NE is not equal to "0" at time t2. This is because the engine rotational speed NE is not updated due to repetition of reverse and normal rotations of the engine immediately before stoppage.

The intake pressure PBA increases faster as the target opening THCMD at time t1 increases, which causes fast reduction of the engine rotational speed NE. In other words, the manner of reduction in the engine rotational speed NE changes depending on changes in the target opening THCMD.

Figure 3:
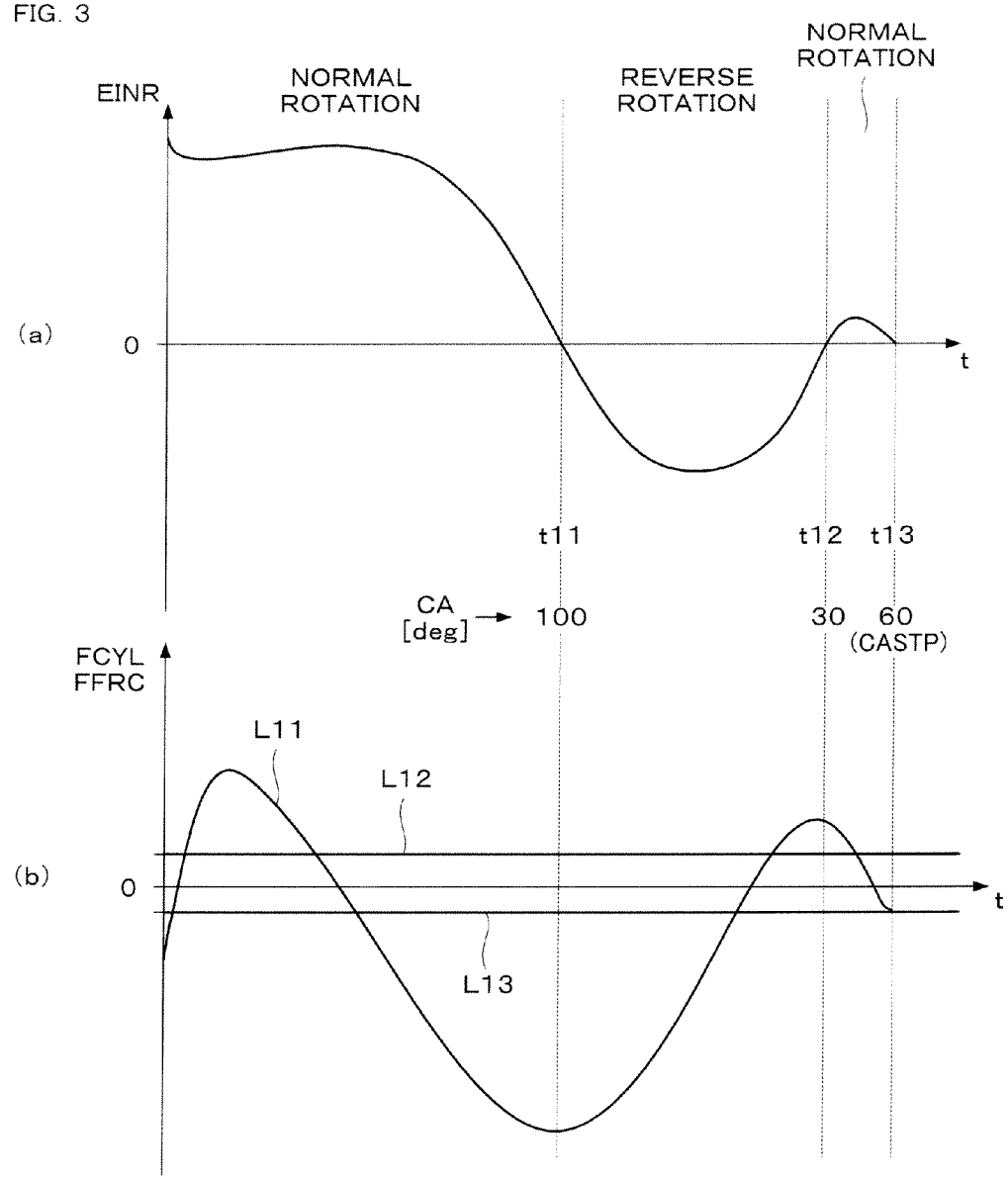
FIG. 3 shows time charts for illustrating the state immediately before the engine stoppage.

FIG. 3(a) shows changes in the inertial energy EINR immediately before engine stoppage, and FIG. 3(b) shows changes in the total cylinder pressure force FCYL (L11) and the friction FFRC (L12, L13) which are described above. As shown in FIG. 3(b), the inertial energy EINR reaches "0" at time t11. However, the reverse rotation starts due to the total cylinder pressure force FCYL if the total cylinder pressure force FCYL is greater than the friction FFRC. Consequently, the inertial energy EINR in the reverse direction is generated, and the normal rotation and the reverse rotation alternate until the inertial energy EINR reaches "0" and the absolute value of the total cylinder pressure force FCYL becomes equal to or less than the absolute value of the friction FFRC (i.e., until the condition that EINR=0 and L13≤L11≤L12 is satisfied). In the example shown in FIG. 3, the inertial energy EINR reaches "0" at time t12 and the normal rotation starts. The inertial energy EINR again reaches "0" at time t13. At time t13, the absolute value of the total cylinder pressure force FCYL is equal to or less than the absolute value of the friction FFRC. Accordingly, the engine stops then. It is to be noted that the engine stops without starting the reverse rotation if the absolute value of the total cylinder pressure force FCYL is equal to or less than the absolute value of the friction FFRC at time t11 when the inertial energy EINR first reaches "0".

Figure 4:
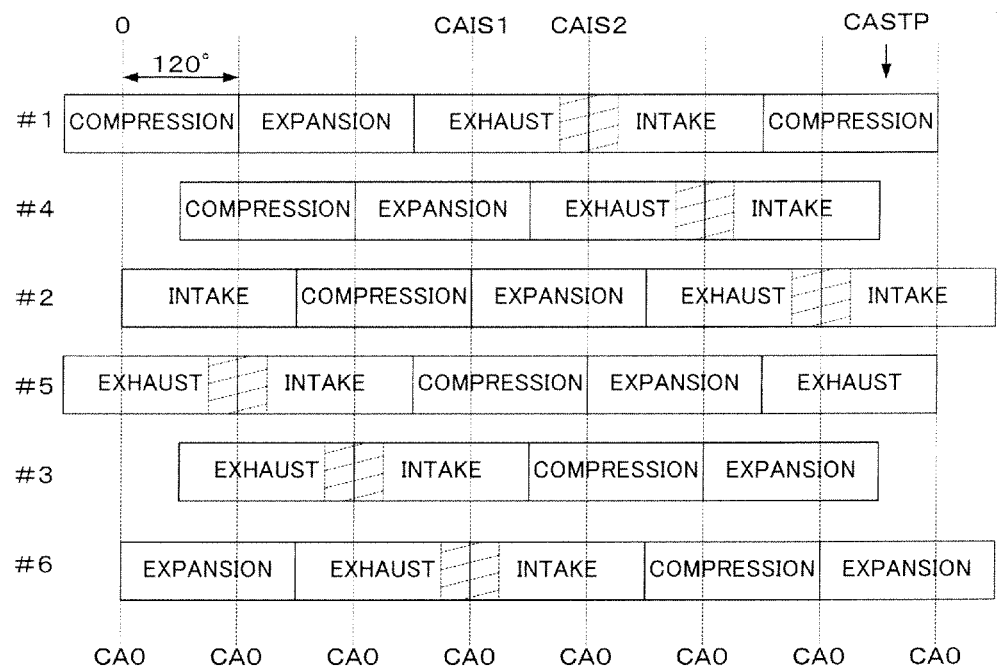
FIG. 4 is a diagram showing the relationship between the strokes of each cylinder and the crank angle regarding a six-cylinder engine.

FIG. 4 shows changes in the strokes in each cylinder of the six-cylinder engine. The region with hatching indicates a crank angular range (hereinafter referred to as "overlap range") where the engine stops in the overlapped state. In this embodiment, as described above, the target opening THCMD is set according to the crank angle CA at time t1, thereby avoiding the stoppage in the overlap range.

Figure 5:
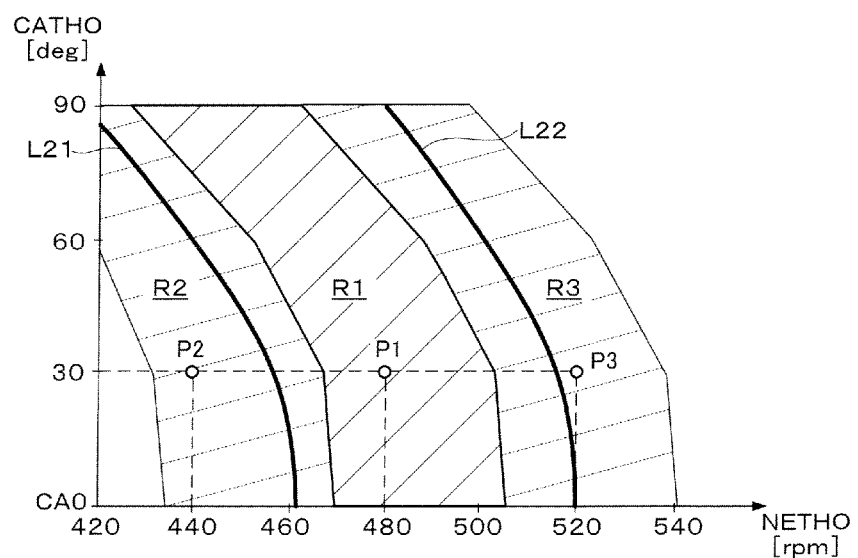
FIG. 5 is a diagram for illustrating that the engine stop position changes depending on the engine rotational speed (NETHO) and the crank angle (CATHO) at the time of the valve opening command of the throttle valve.

FIG. 5 is a diagram for illustrating that the engine stop position changes depending on an engine rotational speed NETHO (hereinafter referred to as "valve opening command rotational speed") and a crank angle CATHO (hereinafter referred to as "valve opening crank angle") at the time of the valve opening command for the throttle valve 3 (time t1 of FIG. 2). In FIG. 5, the region R1 with hatching of solid lines corresponds to a region (hereinafter referred to as "OK region") where the engine stops outside the overlap range, and the regions R2 and R3 with hatching of dashed lines correspond to a region (hereinafter referred to as "NG region") where the engine stops in the overlap range. It is to be noted that the regions R1 to R3 shown in FIG. 5 are empirically obtained by maintaining the valve opening of the throttle valve 3 at a constant value.

For example, when the valve opening command rotational speed NETHO is 440 rpm and the valve opening crank angle CATHO is 30 degrees (point P2), the engine stops in the overlap range. When the valve opening command rotational speed NETHO is 480 rpm and the valve opening crank angle CATHO is 30 degrees (point P1), the engine stops outside the overlap range. When the valve opening command rotational speed NETHO is 520 rpm and the valve opening crank angle CATHO is 30 degrees (point P3), the engine stops in the overlap range.

Therefore, if the valve opening command for the throttle valve 3 is issued in the OK region R1 shown in FIG. 5, the engine can be stopped outside the overlap range. However, the engine rotational speed NE and the crank angle CA may change as indicated by the curve L21 or L22 of FIG. 5 before the engine stops, depending on a relationship between the turn-off timing of the ignition switch and the engine rotational speed NE and the crank angle CA at the turn-off timing. In such case, the valve opening command for the throttle valve cannot be issued in the OK region R1, and the stoppage outside the overlap range cannot be realized.

Therefore, in this embodiment, by changing the throttle valve opening at the issuance timing of the valve opening command for the throttle valve 3 according to the crank angle CA, the stoppage outside the overlap range is surely realized.

Figure 6:
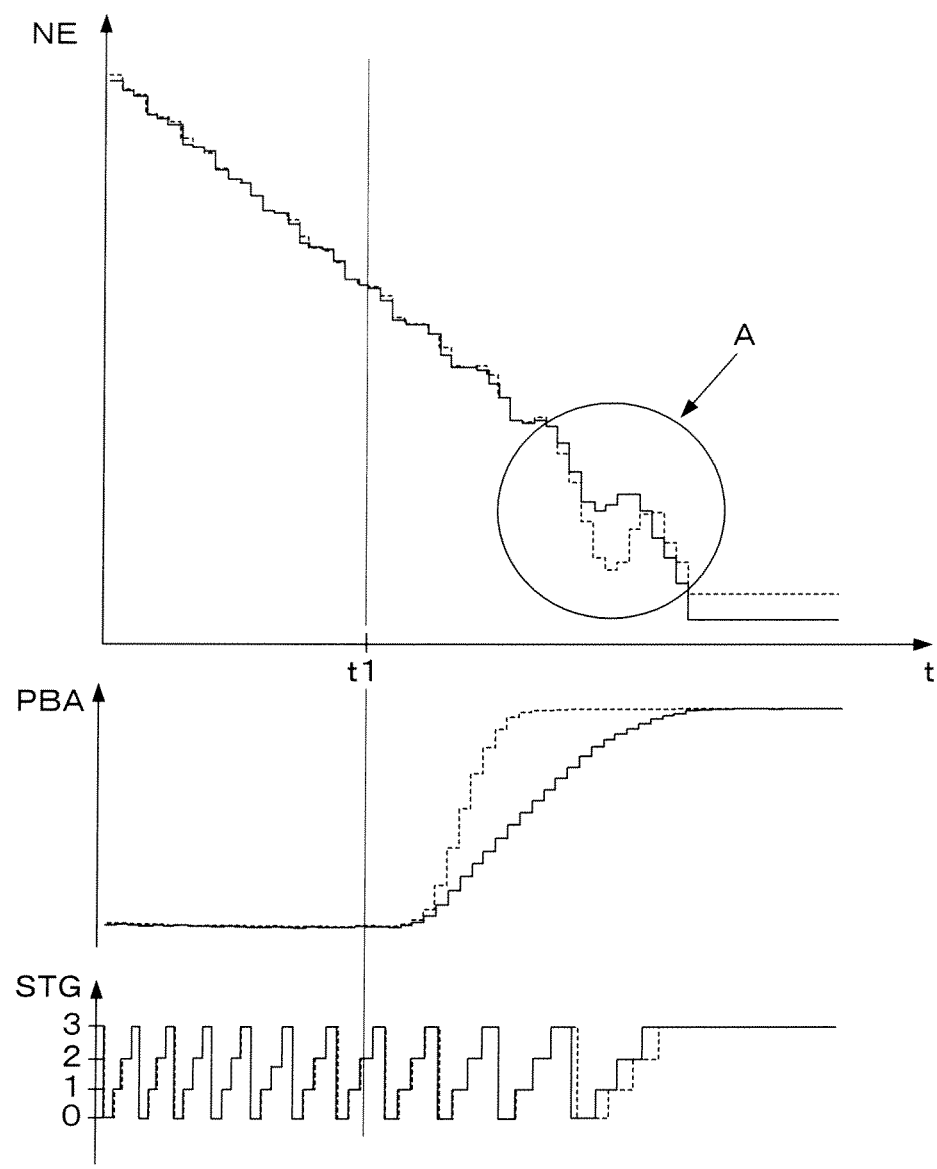
FIG. 6 shows time charts for illustrating that the manner of changes in the engine rotational speed (NE) and the intake pressure (PBA) after opening of the throttle valve, changes depending on the throttle valve opening at the time of the valve opening command of the throttle valve.

FIG. 6, similarly to FIG. 2, shows changes in the engine rotational speed NE, the intake pressure PBA, and the stage number STG after turning-off of the ignition switch. The solid lines correspond to the case where the target opening THCMD of the throttle valve 3 is set to a first opening THS1 (e.g., 17.5 degrees), and the dashed lines correspond to the case where the target opening THCMD is set to a second opening THS2 (e.g., 30 degrees). When the target opening THCMD is set to the second opening THS2, the increase speed of the intake pressure PBA becomes higher compared with the case where the target opening THCMD is set to the first opening THS1, which makes the fall in the engine rotational speed NE larger in the A section indicated in FIG. 6. Therefore, the engine stop position can be controlled to a position outside the overlap range.

Figure 7:
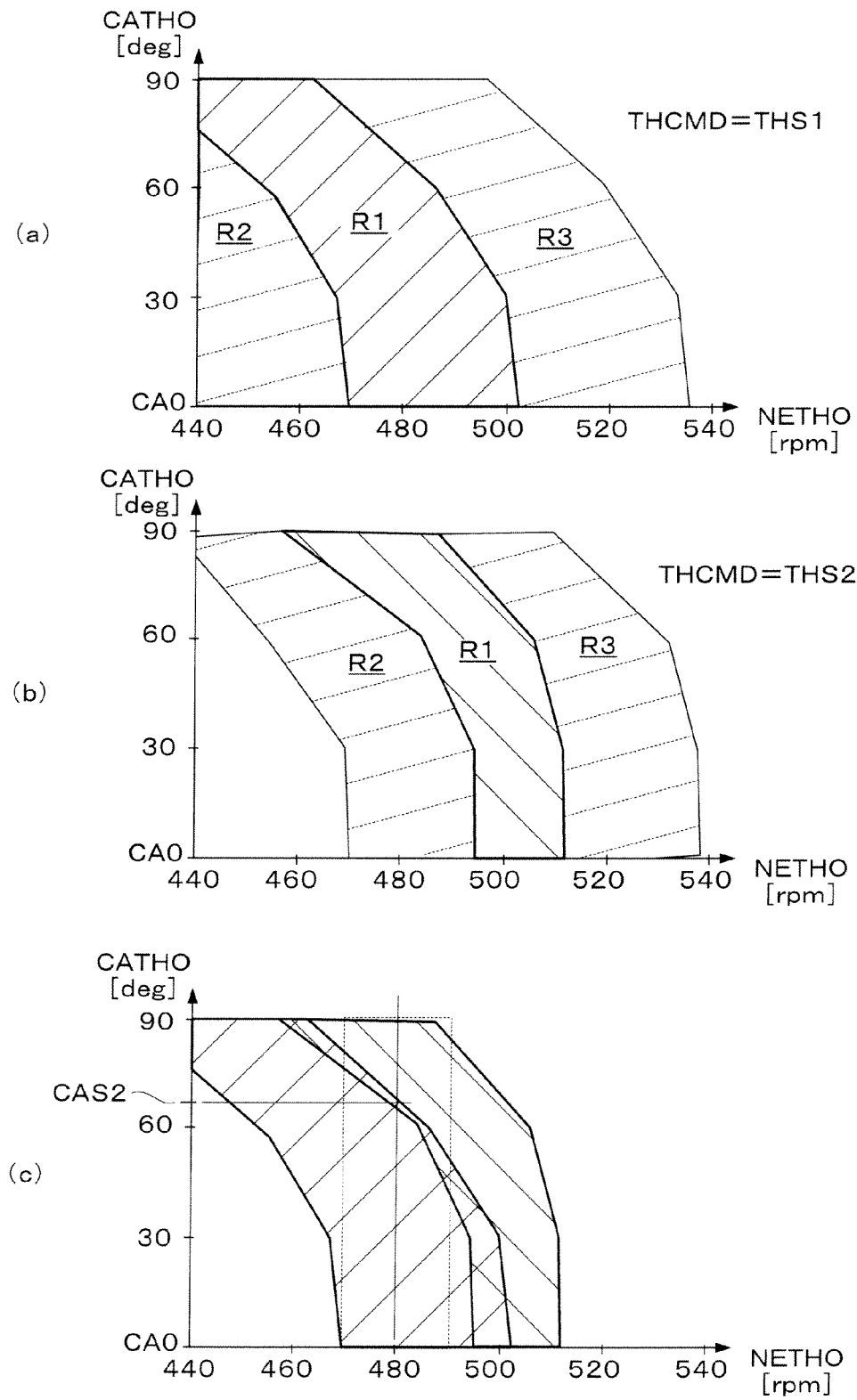
FIG. 7 shows diagrams for illustrating that the engine stop position changes depending on the throttle valve openings (THS1, THS2) at the time of the valve opening command of the throttle valve.

FIG. 7(a) shows the OK region R1 and the NG regions R2 and R3 when the target opening THCMD is set to the first opening THS1. FIG. 7(b) shows the OK region R1 and the NG regions R2 and R3 when the target opening THCMD is set to the second opening THS2. As apparent from comparison between FIGS. 7(a) and 7(b), the OK region corresponding to the second opening THS2 is shifted to the higher rotational speed side compared with the OK region corresponding to the first opening THS1. It is to be noted that the width of the OK region tends to become narrower as the OK region moves to the higher rotational speed side, and converge to a certain width.

In the stroke immediately before engine stoppage, the difference between the absolute value of the negative force required for compression of air in one cylinder and the absolute value of the positive force generated by expansion of air in another cylinder, becomes smaller as the valve opening timing of the throttle valve 3 advances to the higher rotational speed side. Consequently, the total cylinder pressure force FCYL which is the force for controlling the engine stop position decreases, to make the width of the OK region narrower. However, since the pressure on the downstream side of the throttle valve does not exceed the atmospheric pressure, the width of the OK region converges to a certain width if the throttle valve opening timing further advances to the higher rotational speed side. On the other hand, if the valve opening timing of the throttle valve 3 is retarded to the lower rotational speed side, the engine stops before rise in the pressure on the downstream side of the throttle valve, and the width of the OK region tends to become "0".

FIG. 7(c) is a diagram showing both of the OK regions R1 of FIGS. 7(a) and 7(b). The engine stop position can be surely controlled to a position outside the overlap range by setting the target opening THCMD to the first opening THS1 when the crank angle CA is between the reference angle CA0 and a threshold value CAS2 (shown in FIG. 7(c)) at the time the engine rotational speed NE reaches the range in the vicinity of 480 rpm, and setting the target opening THCMD to the second opening THS2 when the crank angle CA is greater than the threshold value CAS2 at the time the engine rotational speed NE reaches the range in the vicinity of 480 rpm.

As described above, the engine stop control of this embodiment is characterized in that the OK regions corresponding to a plurality of throttle valve openings (THS1, THS2) mutually complement each other for coping with any manner of changes in the engine rotational speed upon the engine stoppage. This feature is attained by contemplating the following points: 1) the cylinder pressure work ECYL changes by changing the throttle valve opening when opening the throttle valve immediately before engine stoppage, and accordingly the OK region (i.e., the relationship between the crank angle CA and the engine rotational speed NE when opening the throttle valve, and the piston position at the engine stoppage) changes, and 2) the OK region corresponding to one throttle valve opening (THS1 or THS2) can not cover (cope with) all manners of changes in the engine rotational speed upon engine stoppage (i.e., all loci on the characteristic diagram of FIG. 5).

Figure 8:
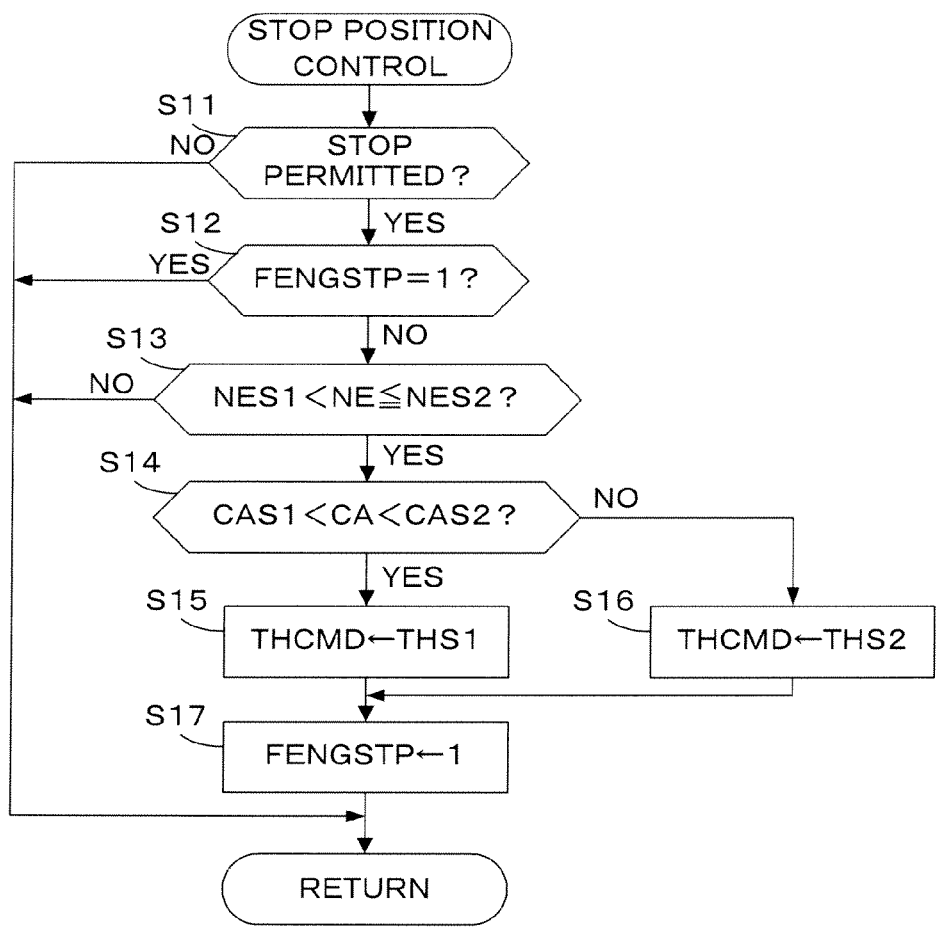
FIG. 8 is a flowchart of the stop position control (the first embodiment)

FIG. 8 is a flowchart of the stop position control described above. The stop position control is executed by the CPU in the ECU 5 at predetermined time intervals (e.g., 10 milliseconds) during the operation of the engine 1.

In step S11, it is determined whether or not a stop permission of the engine 1 has been made. Specifically, it is determined whether the ignition switch has been turned off, or the idle-stop command has been issued. If the stop permission is made, the fuel supply to the engine 1 and the ignition by the spark plug 9 are stopped. In order to reduce the vibration accompanying stoppage of the engine 1, it is preferable to maintain the throttle valve in the closed position until the throttle valve is opened by the above-described stop position control after the stop permission of the engine 1 is made. Therefore, in this embodiment, when the stop permission of the engine 1 is made, the target opening THCMD of the throttle valve is set to an opening (0) of the closed position. If the answer to step S11 is negative (NO), the process immediately ends.

If the stop permission is made, the process proceeds from step S11 to step S12, in which it is determined whether or not a valve opening command flag FENGSTP is equal to "1". The valve opening command flag FENGSTP is set to "1" in step S17. Since the valve opening command flag FENGSTP is initially equal to "0", the process proceeds to step S13.

In step S13, it is determined whether or not the engine rotational speed NE is higher than a first predetermined rotational speed NES1 (e.g., 475 rpm) and equal to or lower than a second predetermined rotational speed NES2 (e.g. 485 rpm). If the answer to step S13 is negative (NO), the process ends. If the answer to step S13 becomes affirmative (YES), i.e., if the engine rotational speed NE decreases to reach the second predetermined rotational speed NES2, the process proceeds to step S14, in which it is determined whether or not the crank angle CA is greater than a first predetermined angle CAS1 (e.g., an angle corresponding to the reference angle position CA0) and less than a second predetermined angle CAS2 (e.g., CA0+65). If the answer to step S14 is affirmative (YES), the target opening THCMD is set to the first opening THS1 (step S15). On the other hand, if the answer to step S14 is negative (NO), the target opening THCMD is set to the second opening THS2 (step S16). It is to be noted that the predetermined rotational speeds NES1 and NES2 are set so that step S14 is surely executed at least once after the ignition switch is turned off.

After execution of step S15 or S16, the valve opening command flag FENGSTP is set to "1" (step S17). Thereafter, the answer to step S12 is affirmative (YES) and the target opening THCMD which is set to THS1 or THS2 is maintained until the engine stops.

According to the process of FIG. 8, setting of the target opening THCMD and issuance of the valve opening command of the throttle valve 3 are performed in the OK region indicated with hatching in FIG. 7(c). Therefore, the engine stoppage in the overlap range can surely be avoided.

Further, the stop position (crank angle position at the time of the engine stoppage) is accurately controllable. Accordingly, by storing the state of stop position, the relationship between each cylinder and the stroke (FIG. 4) is known by the CPU at the beginning of the next engine start. Consequently, the fuel injection and the ignition can appropriately be performed, thereby improving the starting performance of the engine.

Figure 9:
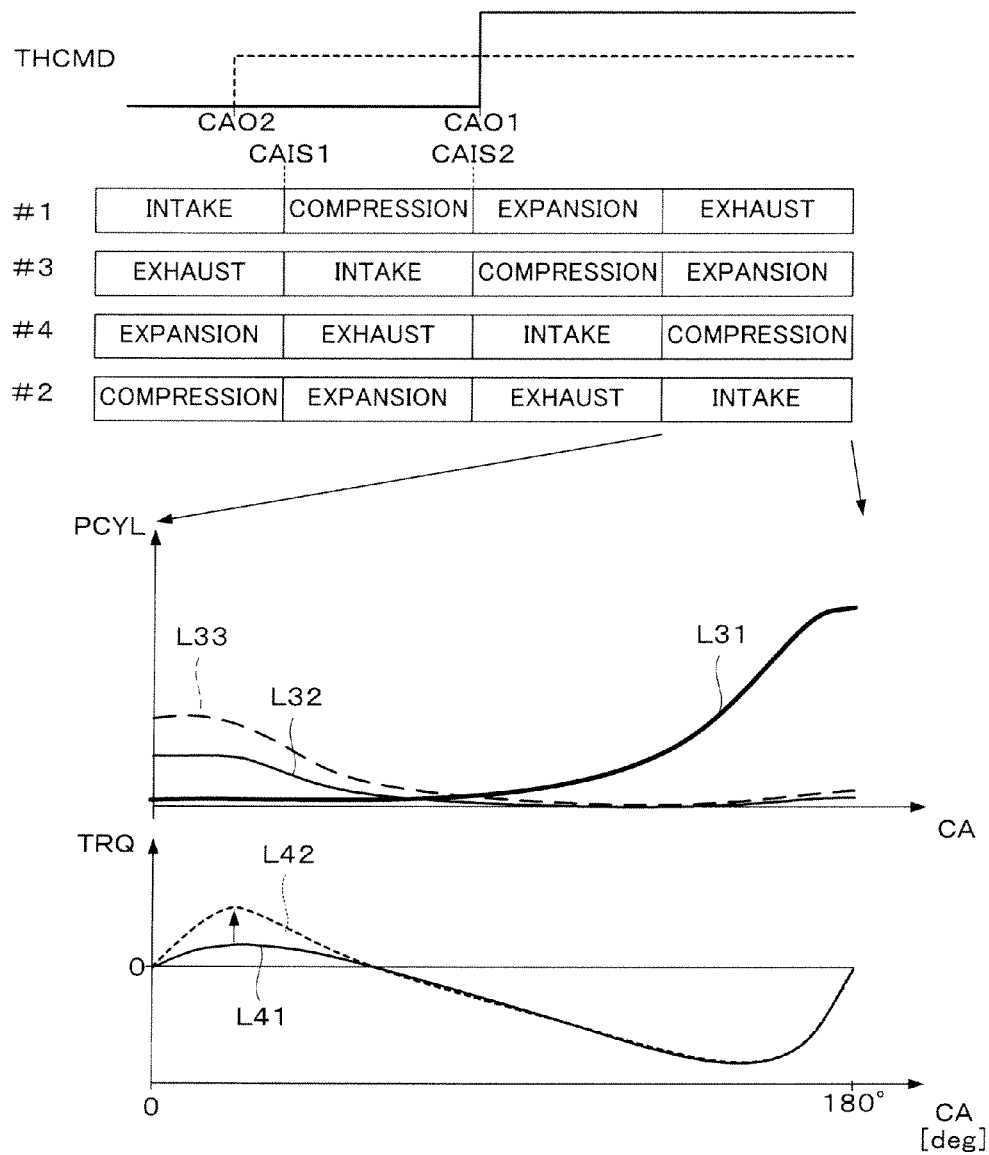
FIG. 9 shows diagrams for illustrating the present invention in comparison with the prior art.

FIG. 9 is a diagram for illustrating the control method in this embodiment in comparison with the control method disclosed in the above-described patent document 1. In this embodiment, the control method is applied to controlling a six-cylinder engine. But the control method according to the patent document 1 is applied to controlling a four-cylinder engine. Therefore. FIG. 9 is a diagram corresponding to the four-cylinder engine.

According to the patent document 1, the idling rotational speed control valve is fully opened in the vicinity of the intake stroke start timing CAO of #4 cylinder (indicated as THCMD in FIG. 9) in order to stop the engine in the compression stroke of #4 cylinder, thereby rapidly increasing the intake air flow rate to increase the braking force (indicated by the solid line L31) generated by the cylinder pressure PCYL in #4 cylinder. If defining a stroke in which the engine stops as "last stroke", the last stroke of #3 cylinder is the expansion stroke. The cylinder pressure PCYL in #3 cylinder is, as shown by the solid line L32, comparatively high at the early stage of the last stroke and gradually decreases to generate a positive torque TRQP (indicated by the solid line L41). According to the method of the patent document 1, the valve opening timing of the idling rotational speed control valve is in the vicinity of the crank angle CAO1. Accordingly, the increase in the intake air flow rate due to the opening of the idling rotational speed control valve gives almost no influence to #3 cylinder, and the cylinder pressure PCYL is comparatively low as indicated by the solid line L32, which makes the generated positive torque TRQP comparatively small as indicated by the solid line L41. Therefore, the reversely rotating angle in the last stroke immediately before engine stoppage becomes comparatively large, and the stop position may not accurately be controlled.

On the other hand, in this embodiment, the throttle valve is opened by a comparatively low opening at the valve opening timing CAO2 which is earlier than the start timing CAIS1 of the last intake stroke of #3 cylinder immediately before engine stoppage. Accordingly, the intake air amount of #3 cylinder increases, and the cylinder pressure PCYL in the last expansion stroke increases as indicated by the dashed line L33, which makes the positive torque TRQP increase as indicated by the dashed line L42. According to this control, it is possible to prevent the engine from reversely rotating and stopping in the overlapped state, and to accurately control the stop position. It is to be noted that the throttle valve opening timing is preferably set before the above-described start timing CAIS1 of the intake stroke. By setting the throttle valve opening timing before the start timing CAIS2 of the last intake stroke of #4 cylinder whose last stroke is the compression stroke, the intake air amount of #3 cylinder can be increased to make the positive torque TRQP increase, compared with the conventional method.

It is to be noted that the above-described intake stroke start timings CAIS1 and CAIS2 in the six-cylinder engine of this embodiment are shown in FIG. 4. The intake stroke start timings CAIS1 and CAIS2 indicated in FIG. 4 correspond to the case where the engine stops at the crank angle CASTP indicated in FIG. 4.

The first and second predetermined rotational speeds NES1 and NES2, and the first and second predetermined angles CAS1 and CAS2 in the process of FIG. 8 are set based on the characteristic diagram of FIG. 7(c) which is empirically obtained. Alternatively, it is possible to obtain a diagram corresponding to the characteristic diagram of FIG. 7(c) by calculation or computer simulation using the inertial energy EINR, the cylinder pressure work ECYL, and the friction work EFRC immediately after the ignition switch is turned off. These parameters EINR, ECYL, and EFRC are obtained by the calculation described below.

The inertial energy EINR is calculated by the following equation (1).

$$EINR = (1/2)I \cdot \omega^2 \quad (1)$$

In the equation (1), "I" is a combined inertia moment of the piston, the crankshaft, and the rotationally-driven parts connected to the crankshaft of the engine 1. The inertia moment I is a parameter which is uniquely determined depending on the engine specification. "$\omega$" is a parameter obtained by converting the engine rotational speed NE to the rotational angular speed.

Next, the calculation method of the cylinder pressure work ECYL will be described with reference to FIGS. 10(a) to 10(c). A force FL in the direction along the connecting rod is calculated by the following equation (2) where a length L of the connecting rod, a crank radius R, and angles $\phi$ and $\theta$ are defined as indicated in FIG. 10(a).

[Eq. 1]

$$FL = F\sqrt{1 - \left(\frac{R}{L}\sin\theta\right)^2} \quad (2)$$

In the equation (2), "F" is a force in the vertically downward direction generated by the cylinder pressure PCYL, which is calculated by the following equation (3).

$$F = PCYL \times AIN - PA \times AOUT \quad (3)$$

where PA is the atmospheric pressure; and AIN and AOUT are respectively an area of the top surface of the piston and an area of the bottom surface of the piston.

Further, the cylinder pressure PCYL is obtained as a function of the crank angle ($\theta$ in FIG. 10) using the relationship of the following equation (4) shown below and the initial condition that the cylinder pressure at the time when the intake stroke ends is substantially equal to the intake pressure PBA.

$$PCYL \times V^k = \text{constant} \quad (4)$$

where "V" is a volume of the combustion chamber, and "k" is a polytropic index which is set to 1.3, for example.

Further, a force FR which acts vertically to the straight line L51 passing through the center of the crankshaft shown in FIG. 10(c) is given by the following equation (5) using the force FL. The equation (6) is obtained by applying the equation (2) to the equation (5). It is to be noted that sin φ in the equation (5) is given by the following equation (7).

$$FR = FL \times \sin\phi \qquad (5)$$

[Eq. 2]

$$FR = F\sqrt{1 - \left(\frac{R}{L}\sin\theta\right)^2} \cdot \sin\psi \qquad (6)$$

$$\sin\psi = \sin\theta\left(\cos\phi + \frac{R}{L}\cos\theta\right) \qquad (7)$$

Therefore, the cylinder pressure work ECYL is calculated by the following equation (8).

[Eq. 3]

$$ECYL = \Sigma FR \cdot R \cdot \Delta\theta \qquad (8)$$

The cylinder pressure PCYL changes depending on the setting of the target opening THCMD at the throttle valve opening timing (time t1 in FIG. 2), which consequently changes the cylinder pressure work ECYL.

Further, the friction work EFRC can be obtained by any one of the two methods described below.

The first method is that the friction work EFRC is obtained from the torque generated by a motor (e.g., the starter motor) when rotating the engine by the motor.

The second method is a method as follows: A consumed inertial energy ΔE is calculated from a difference between the rotational speed ω1 at the staring time of a predetermined stroke and the rotational speed ω2 at the end time of the predetermined stroke during the fuel cut operation where the fuel supply to the engine is stopped. Next, an inter-stroke friction work ΔEFRC is calculated by subtracting an inter-stroke cylinder pressure work ΔECYL from the consumed inertial energy ΔE.

Specifically, the consumed inertial energy ΔE is calculated by the following equation (9), and the inter-stroke friction work ΔEFRC is calculated by the following equation (10).

$$\Delta E = (1/2)I \cdot \omega 1^2 - (1/2)I \cdot \omega 2^2 \qquad (9)$$

$$\Delta ERFC = \Delta E - \Delta ECYL \qquad (10)$$

The crank angle CA (θ) at which the inertial energy EINR reaches "0" and the absolute value of the total cylinder pressure force FCYL is equal to or less than the absolute value of the friction FFRC, can be calculated using the inertial energy EINR, the cylinder pressure work ECYL, and the friction work EFRC which are calculated as described above. Consequently, the stop position can be obtained by the calculation, and the characteristic diagram as shown in FIG. 7(c) can be drawn from the calculation results.

In this embodiment, the throttle valve 3 corresponds to the intake air flow rate control valve, the crank angle position sensor 8 corresponds to the rotational angle detecting means and the rotational speed detecting means, and the ECU 5 constitutes the stop means and the stop position control means.

[Modification]

Figure 11:
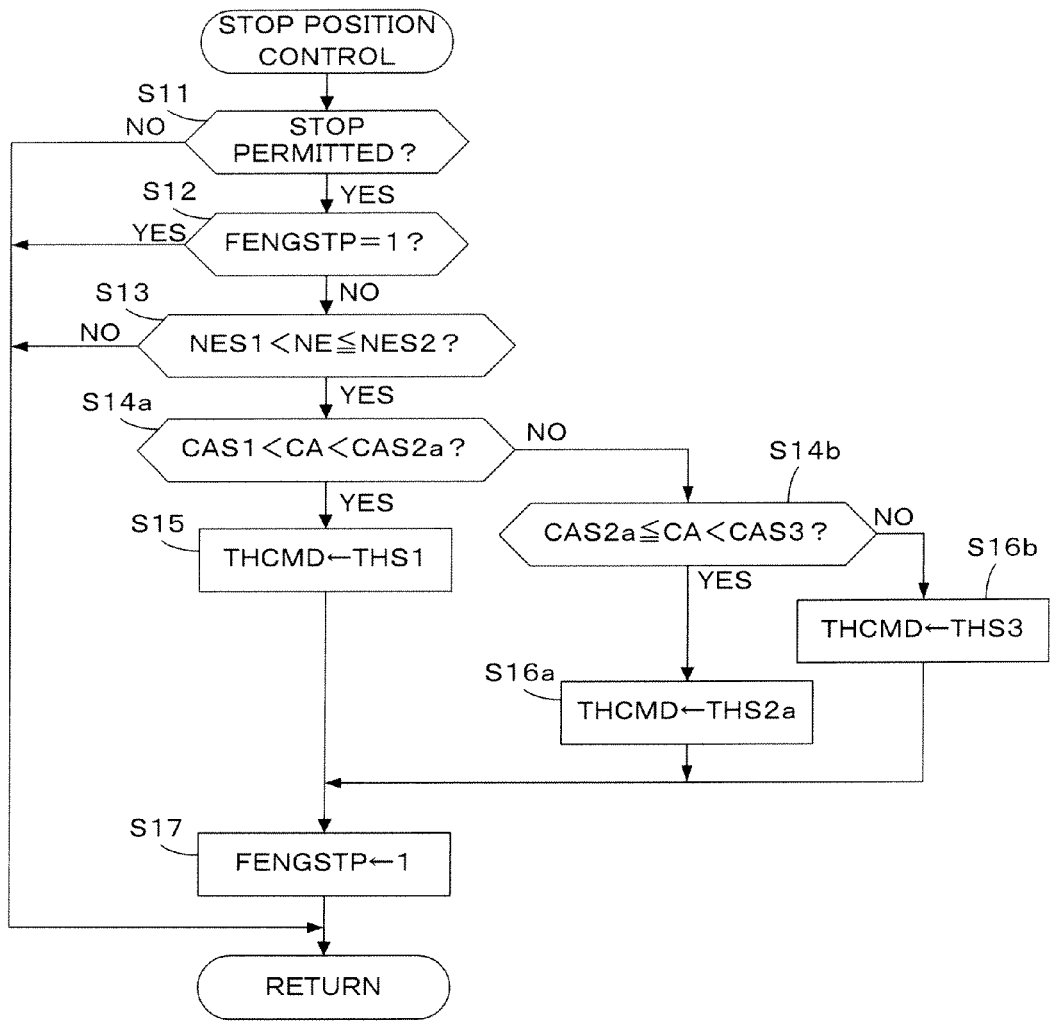
FIG. 11 is a flowchart for showing a modification of the process shown in FIG. 8.

In the embodiment described above, the stop position control may be performed by the process shown in FIG. 11 instead of the process shown in FIG. 8. The process of FIG. 11 is obtained by replacing steps S14 and S16 of FIG. 8 respectively with steps S14a and S16a, and adding steps S14b and S16b.

In step S14a, it is determined whether or not the crank angle CA is greater than the first predetermined angle CAS1 and less than a second predetermined angle CAS2a (<CAS2). If the answer to step S14a is negative (NO), it is determined the crank angle CA is equal to or greater than the second predetermined angle CAS2a and less than a third predetermined angle CAS3 (step S14b). If the answer to step S14b is affirmative (YES), the target opening THCMD is set to a second opening THS2a (<THS2) (step S16a). On the other hand, if the answer to step S14b is negative (NO), the target opening THCMD is set to a third opening THS3 (>THS2) (step S16b).

As described above, by setting each of the crank angular ranges to a narrower range and setting the target opening THCMD to three different values corresponding to the three angular ranges, the stop in the overlap range can be avoided with more certainty.

Further, the target opening THCMD may be set by retrieving a THS table in which a set opening THS is set according to the crank angle CA at the time the answer to step S13 becomes affirmative (YES). The THS table for this control is set so that the set opening THS increases as the crank angle CA increases.

Second Embodiment

Figure 12:
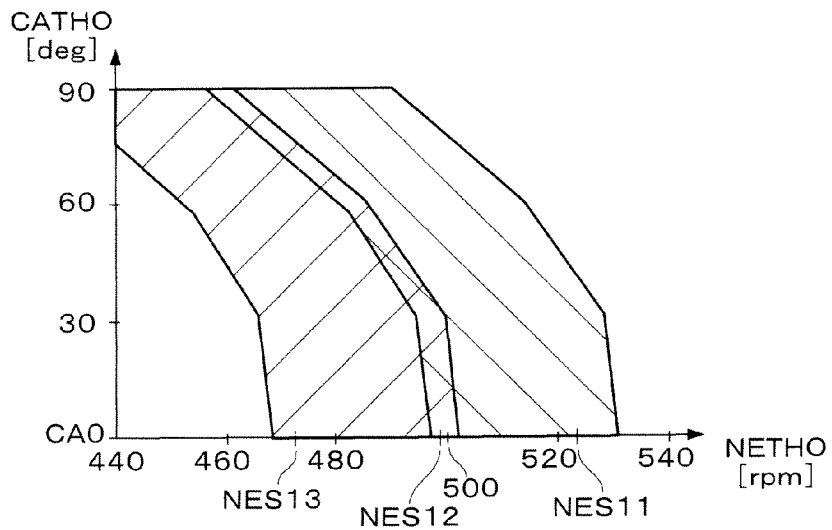
FIG. 12 is a diagram for illustrating the stop position control of the second embodiment of the present invention.

FIG. 12 is a characteristic diagram for illustrating the stop position control in this embodiment, in which the OK regions corresponding to the two throttle valve openings THS1 and THS2 are indicated similarly to FIG. 7(c) described above. However, the pattern of the OK regions is a little different from that of FIG. 7(c). In this embodiment, the target opening THCMD is set to the first opening THS1 or the second opening THS2 according to the engine rotational speed NE when the crank angle CA is equal to the reference angle CAO. The present embodiment is the same as the first embodiment except for the points described below.

Figure 13:
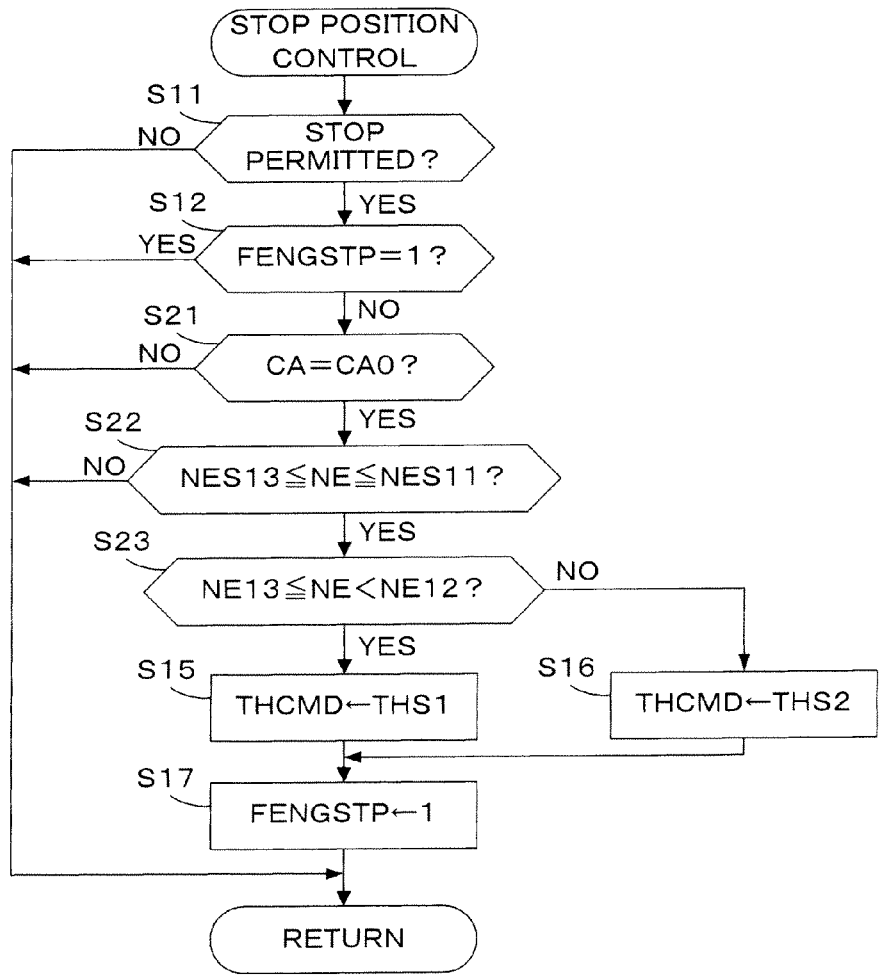
FIG. 13 is a flowchart of the stop position control (the second embodiment).

FIG. 13 is a flowchart of the stop position control in this embodiment. FIG. 13 is obtained by replacing steps S13 and S14 of FIG. 8 respectively with steps S22 and S23 and adding step S21.

In step S21, it is determined whether or not the crank angle CA is equal to the reference angle CA0. In step S21, it may be determined whether the crank angle CA is in a predetermined range (CA0±ΔCA) whose center is the reference angle CA0.

If the answer to step S21 is negative (NO), the process immediately ends. If the answer to step S21 is affirmative (YES), it is determined whether or not the engine rotational speed NE is equal to or lower than a third predetermined rotational speed NES11 and equal to or higher than a fifth predetermined rotational speeds NES13 (step S22). If the answer to step S22 is negative (NO), the process immediately ends. If the answer to step S22 is affirmative (YES), it is determined whether or not the engine rotational speed NE is lower than a fourth predetermined rotational speed NES12 and equal to or higher than the fifth predetermined rotational speeds NES13 (step S23). It is to be noted that the predetermined rotational speeds NES11 and NES13 are set so that step S23 is surely performed at least once after the ignition switch is turned off.

If the answer to step S23 is affirmative YES), the target opening THCMD is set to the first opening THS1 (step S15). On the other hand, if the answer to step S23 is negative (NO), the target opening THCMD is set to the second opening THS2 (step S16).

The above-described third to fifth predetermined rotational speeds NES11, NES12, and NES13 are set as indicated in FIG. 12. In the OK regions, the target opening THCMD is set to a suitable opening by the process of FIG. 13, thereby surely avoiding the stop in the overlap range. Further, since the OK region can be extended in the direction of the engine rotational speed (the direction of the horizontal axis), it is possible to accurately perform the stop position control even if the engine friction has changed due to aging, to shift the OK region in the direction of the horizontal axis.

It is to be noted, in this embodiment, that the throttle valve opening may be set to three different values or more as described in the modification of the first embodiment.

Third Embodiment

Figure 14:
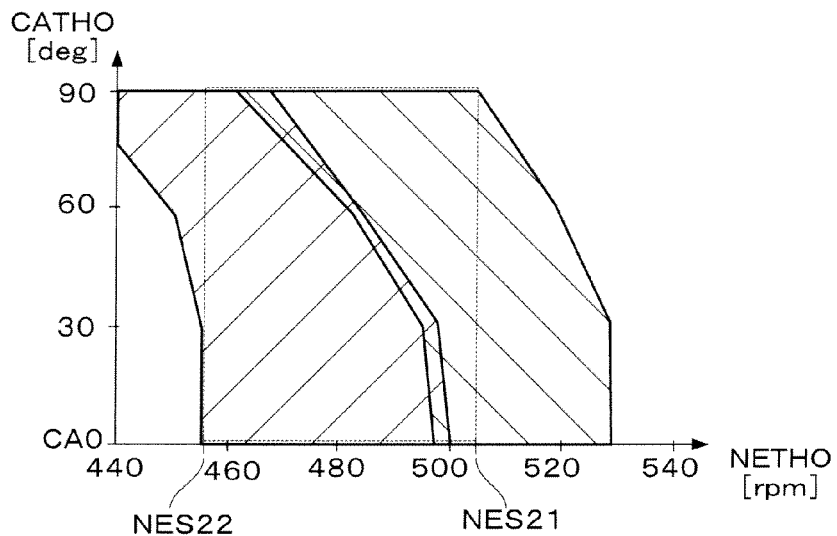
FIG. 14 is a diagram for illustrating the stop position control of the third embodiment of the present invention.

FIG. 14 is a characteristic diagram for illustrating the stop position control of this embodiment, in which the OK regions corresponding to the two throttle valve openings THS1 and THS2 are indicated similarly to FIG. 7(c) described above. However, the pattern of the OK regions is a little different from that of FIG. 7(c). In this embodiment, when the engine rotational speed NE is equal to or lower than a sixth predetermined rotational speeds NES21 and equal to or higher than a seventh predetermined rotational speed NES22, the target opening THCMD is set to the first opening THS1 or the second opening THS2a by retrieving a THS map which is set according to the engine rotational speed NE and the crank angle CA. The present embodiment is the same as the first embodiment except for the points described below.

Figure 15:
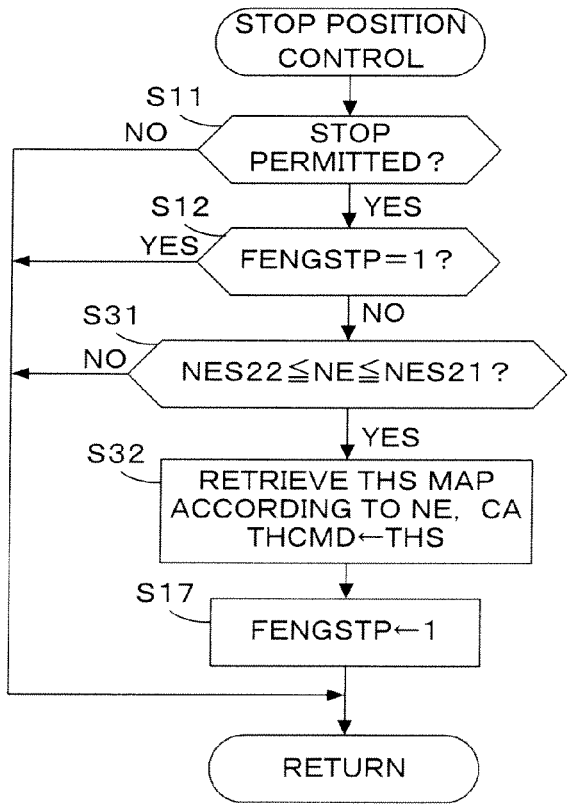
FIG. 15 is a flowchart of the stop position control (the third embodiment).

FIG. 15 is a flow chart of the stop position control of this embodiment. FIG. 15 is obtained by deleting steps S14 and S16 of FIG. 8, and replacing steps S13 and S15 respectively with steps S31 and S32.

In step S31, it is determined whether or not the engine rotational speed NE is equal to or lower than the sixth predetermined rotational speed NES21 and equal to or higher than the seventh predetermined rotational speed NES22. If the answer to step S31 is negative (NO), the process immediately ends. If the answer to step S31 is affirmative (YES), the THS map shown in FIG. 16 is retrieved according to the engine rotational speed NE and the crank angle CA, to determine a set opening THS. Then, the target opening THCMD is set to the set opening THS (step S32). The THS map is set for the portion surrounded with the thin dashed line in FIG. 14, so that the first opening THS1 or the second opening THS2 is selected in accordance with the OK region corresponding to the first opening THS1 and the OK region corresponding to the second opening THS2. It is to be noted that the predetermined rotational speeds NES21 and NES22 are set so that step S32 is surely performed at least once after the ignition switch is turned off.

The above-described sixth and seventh predetermined rotational speeds NES21 and NES22 are set as indicated in FIG. 14, and the target opening THCMD is set to a suitable opening in the OK regions by the process of FIG. 15, thereby surely avoiding the stop in the overlap range. Further, since the OK region can be extended in the direction of the engine rotational speed (the direction of the horizontal axis), it is possible to accurately perform the stop position control, even if the engine friction has changed due to aging, to shift the OK region in the direction of the horizontal axis.

In this embodiment, two values of the first and second openings THS1 and THS2 are set in the THS map. Alternatively, the OK region may be divided into three or more regions and three or more values may be set in the THS map.

The present invention is not limited to the embodiments described above, and various modifications may be made. For example, the intake air flow rate control valve is not limited to the throttle valve. Alternatively, the idling rotational speed control valve provided in the passage which bypasses the throttle valve as shown in the patent document 1, or the intake valve (and its valve-actuating mechanism) whose lift amount and opening period is continuously changeable, may be used as the intake air flow rate control valve.

Further, in the above-described embodiments, both of the fuel supply and the ignition are stopped when the engine stop permission is made. Alternatively, either the fuel supply or the ignition may be stopped. Further, in the above-described embodiments, examples in which the present invention is applied to the six-cylinder engine are shown. The present invention is applicable also to engines having any number of cylinders.

Further, in the above-described embodiments, examples in which the present invention is applied to the stop position control of the engine in which fuel is injected into the intake pipe, are shown. The present invention is also applicable to the stop position control of the engine in which fuel is directly injected into the combustion chamber. Further, the present invention can be applied also to the stop position control of a watercraft propulsion engine such as an outboard engine having a vertically extending crankshaft.

Further, in the above-described embodiments, examples in which the crank angle position sensor 8 includes the cylinder discrimination sensor, are shown. The cylinder distinction can be performed based on the TDC pulse and the CRK pulse. Therefore, the cylinder discrimination sensor may be omitted.

DESCRIPTION OF REFERENCE NUMERALS

1 Internal combustion engine
2 Intake pipe
3 Throttle valve (intake air flow rate control valve)
5 Electronic control unit (stop means, stop position control means)
8 Crank angle position sensor (rotational angle detecting means, rotational speed detecting means)

The invention claimed is:

1. A stop control system for an internal combustion engine, including stop means for stopping at least one of the ignition and the fuel injection of said engine based on a stop command, an intake air flow rate control valve for controlling an intake air flow rate of said engine, stop position control means for controlling a stop position of a piston of said engine by actuating said intake air flow rate control valve, and rotational angle detecting means for detecting a rotational angle of a crankshaft of said engine, and rotational speed detecting means for detecting a rotational speed of the said engine, said stop control system being characterized in that,
    said stop position control means determines a valve opening amount of said intake air flow rate control valve using the engine rotational speed detected by said rotational speed detecting means and the rotational angle detected by said rotational angle detecting means, after the operation of said stop means, and actuates said intake air flow rate control valve so that the valve opening amount of said intake air flow rate control valve coincides with the determined valve opening amount, thereby increasing the intake air flow rate.

2. A stop control system according to claim 1, wherein said stop position control means determines the valve opening amount of said intake air flow rate control valve based on the detected rotational angle at the time when the detected engine rotational speed becomes equal to or lower than a predetermined rotational speed.

3. A stop control system according to claim 1, wherein said stop position control means determines the valve opening amount of said intake air flow rate control valve based on the detected engine rotational speed at the time when the detected rotational angle reaches a predetermined rotational angle.

4. A stop control system according to claim 1, wherein said stop position control means retrieves a map on which the valve opening amount of said intake air flow rate control valve is set according to the engine rotational speed and the rotational angle, to determine the valve opening amount when the detected engine rotational speed is within a predetermined range.

5. A stop control system according to claim 1, wherein the valve opening amount of said intake air flow rate control valve is maintained at the determined valve opening amount until the engine rotational speed reaches "0".

6. A stop control system according to claim 1, wherein said intake air flow rate control valve is opened before the start timing of the last intake stroke of a cylinder before the engine stoppage, said cylinder being estimated to be in the compression stroke at the time of the engine stoppage.

7. A stop control system according to claim 1, wherein said intake air flow rate control valve is opened before the start timing of the last intake stroke of a cylinder before the engine stoppage, said cylinder being estimated to be in the expansion stroke at the time of the engine stoppage.

8. A stop control method for an internal combustion engine for controlling a stop position of a piston of said engine by actuating an intake air flow rate control valve for controlling an intake air flow rate of said engine, when stopping said engine by stopping at least one of the ignition and the fuel injection of said engine based on a stop command, said stop control method being characterized by comprising the steps of:
   a) detecting a rotational angle of a crankshaft of said engine and a rotational speed of said engine;
   b) determining an valve opening amount of said intake air flow rate control valve using the detected engine rotational speed and the detected rotational angle after at least one of the ignition and the fuel injection of said engine is stopped; and
   c) actuating said intake air flow rate control valve so that the valve opening amount of said intake air flow rate control valve coincides with the determined valve opening amount, thereby increasing the intake air flow rate.

9. A stop control method according to claim 8, wherein the valve opening amount of said intake air flow rate control valve is determined in said step c) based on the detected rotational angle at the time when the detected engine rotational speed becomes equal to or lower than a predetermined rotational speed.

10. A stop control method according to claim 8, wherein the valve opening amount of said intake air flow rate control valve is determined in said step c) based on the detected engine rotational speed at the time when the detected rotational angle reaches a predetermined rotational angle.

11. A stop control method according to claim 8, wherein the valve opening amount is determined in said step c) by retrieving a map on which the valve opening amount of said intake air flow rate control valve is set according to the engine rotational speed and the rotational angle when the detected engine rotational speed is within a predetermined range.

12. A stop control method according to claim 8, wherein the valve opening amount of said intake air flow rate control valve is maintained at the determined valve opening amount until the engine rotational speed reaches "0".

13. A stop control method according to claim 8, wherein said intake air flow rate control valve is opened before the start timing of the last intake stroke of a cylinder before the engine stoppage, said cylinder being estimated to be in the compression stroke at the time of the engine stoppage.

14. A stop control method according to claim 8, wherein said intake air flow rate control valve is opened before the start timing of the last intake stroke of a cylinder before the engine stoppage, said cylinder being estimated to be in the expansion stroke at the time of the engine stoppage.

* * * * *